(12) United States Patent
Venkatsubra et al.

(10) Patent No.: US 9,037,745 B2
(45) Date of Patent: May 19, 2015

(54) METHODS AND DEVICES FOR PROCESSING INCOMPLETE DATA PACKETS

(75) Inventors: Venkat Venkatsubra, Austin, TX (US); Richard Perry Youngman, Cedar Park, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2248 days.

(21) Appl. No.: 11/334,658

(22) Filed: Jan. 18, 2006

(65) Prior Publication Data

US 2007/0168545 A1 Jul. 19, 2007

(51) Int. Cl.
| | |
|---|---|
| G06F 15/16 | (2006.01) |
| H04L 29/06 | (2006.01) |
| H04L 1/00 | (2006.01) |
| H04L 29/14 | (2006.01) |

(52) U.S. Cl.
CPC .............. *H04L 69/16* (2013.01); *H04L 1/0083* (2013.01); *H04L 69/166* (2013.01); *H04L 69/40* (2013.01); *H04L 69/28* (2013.01)

(58) Field of Classification Search
USPC .................................................. 709/230–237
See application file for complete search history.

(56) References Cited

U.S. PATENT DOCUMENTS

| | | | | |
|---|---|---|---|---|
| 5,852,631 | A * | 12/1998 | Scott ............................ | 375/222 |
| 6,000,053 | A * | 12/1999 | Levine et al. ................. | 714/766 |
| 6,275,471 | B1 | 8/2001 | Bushmitch et al. | |
| 6,629,151 | B1 * | 9/2003 | Bahl .............................. | 709/250 |
| 7,284,181 | B1 * | 10/2007 | Venkatramani ............... | 714/758 |
| 7,359,983 | B1 * | 4/2008 | Maufer et al. ................. | 709/236 |
| 7,684,440 | B1 * | 3/2010 | Maufer et al. ................. | 370/476 |
| 2002/0131417 | A1 * | 9/2002 | Sandell ...................... | 370/395.1 |
| 2003/0196081 | A1 * | 10/2003 | Savarda et al. ................ | 713/153 |
| 2004/0153935 | A1 * | 8/2004 | Niesen ........................... | 714/746 |
| 2005/0108315 | A1 * | 5/2005 | Singh et al. .................... | 709/200 |
| 2005/0177267 | A1 * | 8/2005 | Chang et al. ................... | 700/121 |
| 2006/0009170 | A1 * | 1/2006 | Bobier .......................... | 455/109 |
| 2006/0133422 | A1 * | 6/2006 | Maughan et al. .............. | 370/474 |

(Continued)

FOREIGN PATENT DOCUMENTS

| | | | |
|---|---|---|---|
| CN | 101018344 A | * | 8/2007 |
| EP | 1170975 A1 | * | 1/2002 |

OTHER PUBLICATIONS

Shuaib et al., "A Cell Loss Padding Technique for the Transport of MPEG-2 Transport Stream over ATM/AAL," IIS 1997, Dec. 1997, p. 450-454.*

(Continued)

*Primary Examiner* — Andrew Goldberg
(74) *Attorney, Agent, or Firm* — Mitch Harris, Atty at Law, LLC; Andrew M. Harris; Parashos T. Kalaitzis

(57) ABSTRACT

A computer implemented method, apparatus, and computer usable program code for processing data packets. A set of data fragments are received at the data processing system to form a set of received data fragments. Assembly of the set of data fragments is initiated into a data packet, and a determination as to whether the data packet is an incomplete data packet. Responsive to a determination that the data packet is an incomplete data packet, the incomplete data packet is filled with at least one character to form a final data packet. The final data packet is forwarded to the target.

17 Claims, 5 Drawing Sheets

(56) References Cited

U.S. PATENT DOCUMENTS

2007/0242645 A1* 10/2007 Stephenson et al. .......... 370/338
2008/0123562 A1* 5/2008 Florit et al. .................. 370/258

OTHER PUBLICATIONS

Dixit et al., "MPEG-2 over ATM for Video Dial Tone Networks: Issues and Strategies," IEEE Network, Sep./Oct. 1995, p. 30-40.*
ITU-T, "Transmission of Non-Telephone Signals," ITU-T Recommendation H.222.0, Jul. 1995.*
Chen et al., "Unidirectional Communication Model for Transmission of Performance Data", IBM Technical Disclosure Bulletin, vol. 36, No. 6B, Jun. 1993, pp. 447-450.
Larzon et al., "The Lightweight User Datagram Protocol (UDP-Lite)", The Internet Society, Jul. 2004, RFC 3828, pp. 1-12. http://rfc3828.x42.com/ retrieved Sep. 29, 2005.

* cited by examiner

METHODS AND DEVICES FOR PROCESSING INCOMPLETE DATA PACKETS

BACKGROUND OF THE INVENTION

1. Field of the Invention

The present invention relates generally to an improved data processing system and in particular to the transmission of data. Still more particularly, the present invention relates to a computer implemented method, apparatus, and computer usable program code for transmitting of data packets over a network to an application.

2. Description of the Related Art

Client and server data processing systems communicate with each other by exchanging data over one or more networks that connect the data processing systems. The networks may include the Internet, a local area network (LAN), a wide area network, and intranet, or any other network that enables two or more data processing systems to exchange data. Data processing systems exchange data over a network by sending data in data structures that may be referred to as data packets. Data packets may include a variety of information, including the destination address, the source address, routing instructions, and application data that is meant to be used by an application executing on the destination data processing system. Thus, data packets may be broken down further into smaller data fragments.

Most files that are to be transmitted from a source data processing system to a destination data processing system contain too much data to place into a single data packet. Thus, a larger original file, such as a word processing document file or a video file, is broken down into many data packets for transmission from a source data processing system to a destination data processing system.

The data packets are then sent from the source data processing system to the destination data processing system. Usually different data packets take different paths through the network or networks and may arrive at different times at the destination data processing system. Network adapters at the destination data processing system receive these data packets and pass them along a bus system to communications software running on the destination data processing system. The communications software includes a protocol stack that receives the data packets through a software construct called a socket. A socket is typically used by an application to read and write TCP/IP messages.

Once received at socket, the data packets are reassembled into the original file by another part of the communications software called the assembly layer. The assembled original file received at the destination data processing system may be referred to as an assembled file. Once the packets are fully assembled to form the assembled file, this file is sent along the bus system to the target. In response, the target uses the assembled file to perform some action or operation. A target may be software or hardware which is adapted to use the data packet to perform some function. An example of a target is a web browser. The web browser may, for example, use the assembled file to display video to a user. Another example of target is a word processor. The word processor may, for example, use the assembled file to display a word processing document file to a user in a manner the user can understand and use. Another target may be a video card adapted for processing data packets containing video files.

However, problems may arise during this process. Because the original file is broken down into many data packets, if some of the data packets become corrupted, lost, or delayed, then the assembled file is not an exact copy of the original file. The assembled file may lack certain information or be corrupted in some way. In this case, the target might not be able to use the assembled file.

Currently, to reduce the chance of assembling a corrupted file, data packets are checked for data integrity to help ensure that all data fragments within the data packet are intact. If a data packet is considered corrupted or lacking data fragments in some way, then the destination data processing system transmits a re-send signal to the source data processing system. In response, the source data processing system resends the requested data packet. Similarly, if some of the data in the assembled file appears to be missing, then the target data processing system may transmit a re-send signal to the source data processing system. In response, the source data processing system resends the requested data packets.

However, this solution creates a new problem. The process of requesting re-transmission of data packets, sending new data packets, and assembling the new data packets consumes time. Thus, resending data packets slows down the process of communicating an original file from the source data processing system to the destination data processing system. When spread across many data processing systems in a network, these delays can result in reducing the overall efficiency of the network, because more total data packets are sent in order for a completed assembled filed to be useful to corresponding target in the destination data processing systems.

SUMMARY OF THE INVENTION

The present invention provides for a computer implemented method, apparatus, and computer usable program code for processing data packets. A set of data fragments are received at the data processing system to form a set of received data fragments. Assembly of the set of data fragments is initiated into a data packet, and a determination as to whether the data packet is an incomplete data packet. Responsive to a determination that the data packet is an incomplete data packet, the incomplete data packet is filled with at least one character to form a final data packet. The final data packet is forwarded to the target.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
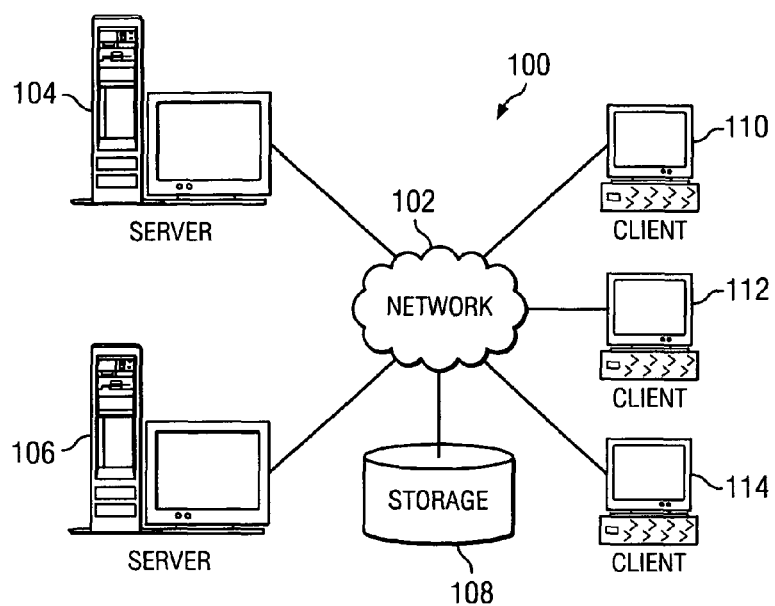
FIG. 1 is a pictorial representation of a network of data processing systems in which aspects of the present invention may be implemented.
Figure 2:
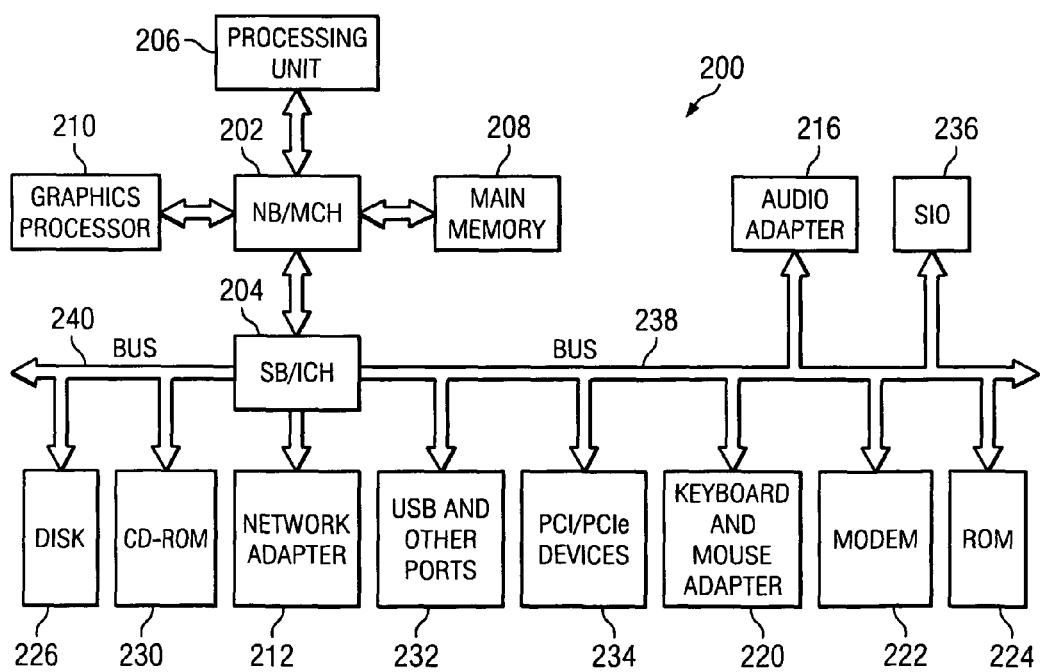
FIG. 2 is a block diagram of a data processing system in which aspects of the present invention may be implemented.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers or data processing systems in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (MCH) 202 and south bridge and input/output (I/O) controller hub (ICH) 204. Processing unit 206, main memory 208, and graphics processor 210 are connected to north bridge and memory controller hub 202. Graphics processor 210 may be connected to north bridge and memory controller hub 202 through an accelerated graphics port (AGP).

In the depicted example, local area network (LAN) adapter 212 connects to south bridge and I/O controller hub 204. Audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

Hard disk drive 226 and CD-ROM drive 230 connect to south bridge and I/O controller hub 204 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java programming system, may run in conjunction with the operating system and provides calls to the operating system from Java programs or applications executing on data processing system 200 (Java is a trademark of Sun Microsystems, Inc. in the United States, other countries, or both).

As a server, data processing system 200 may be, for example, an IBM eServer™ pSeries® computer system, running the Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as hard disk drive 226, and may be loaded into main memory 208 for execution by processing unit 206. The processes for embodiments of the present invention are performed by processing unit 206 using computer usable program code, which may be located in a memory such as, for example, main memory 208, read only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communications fabric or architecture that provides for transmission of data between different components or devices attached to the fabric or architecture. A communications unit may include one or more devices used to transmit and receive data, such as modem 222 or network adapter 212 of FIG. 2. A memory may be, for example, main memory 208, read only memory 224, or a cache such as found in north bridge and memory controller hub 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

The present invention provides for a computer implemented method for processing data packets. A signal at a data processing system is received, in which the signal indicates that a target can accept incomplete data packets. A set of data fragments is then received at the data processing system to form a set of received data fragments. Assembly of the set of data fragments into a data packet is initiated and a determination whether the data packet is an incomplete data packet is made. Responsive to a determination that the data packet is an incomplete data packet, the incomplete data packet is filled with at least one character to form a final data packet. The final data packet is then delivered to the target. The method can also include a short timer that operates on a time scale shorter than a reassembly timer. At the expiration of the short timer, the assembling data packet is checked for completeness. If the data packet is complete at the expiration of the short timer, then the completed data packet is forwarded to the target. In addition, optionally, the duration of the short timer may be reduced by one time interval in response to sending a completed data packet to the target, if the completed data packet is sent at the expiration of the short timer.

Figure 3:
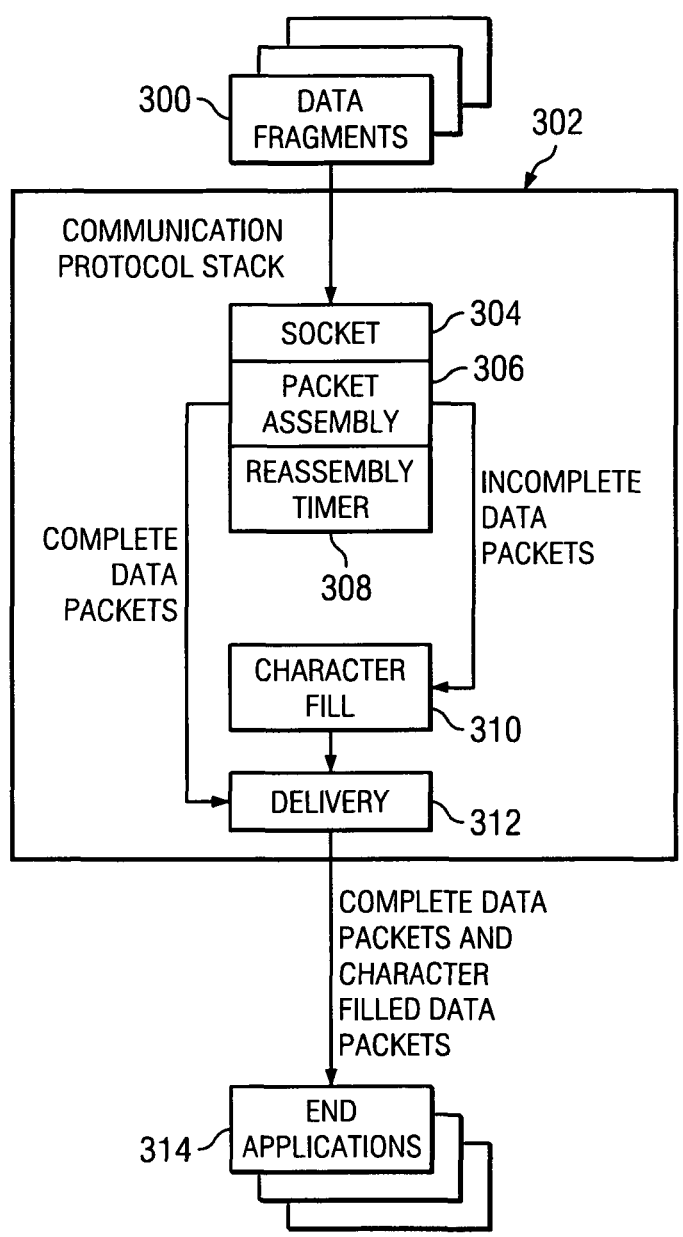
FIG. 3 is a block diagram illustrating components of a communication protocol stack, in accordance with an illustrative embodiment of the present invention.

FIG. 3 is a block diagram illustrating components of a communication protocol stack, in accordance with an illustrative embodiment of the present invention. Data fragments 300 of one or more data packets are received at communication protocol stack 302 of the destination data processing system. In particular, data fragments 300 are received at socket 302. Each data fragment of data fragments 300 is transmitted by a source data processing system and is received at the destination data processing system over a network, such as the Internet or a local area network. Several data fragments 300 may be received over time for each data packet.

Packet assembly component 306 of communication protocol stack 302 assembles all the numerous data fragments 300 to form completed data packets 310. Each completed data packet 310 is ideally an exact copy of a data packet as originally sent by the source data processing system. However, often data packets remain incomplete after the expiration of reassembly timer 308 because required data fragments are delayed, lost, or corrupted. These data packets may be referred to as incomplete data packets 312.

If a data packet is complete at the expiration of reassembly timer 308, completed packet 310 is prepared for delivery at delivery component 316, which may be any suitable communication software or hardware. Thereafter, completed packet 310 is delivered to target 318 for which completed data packet 310 is intended.

In known systems, if a data packet remains incomplete at the expiration of reassembly timer 308, the incomplete data packet 312 is rejected. In this case, the destination data processing system requests the source data processing system to retransmit the entire data packet. In the meantime, target 318 waits for the new packet to arrive, which could force target 318 to delay execution of its intended function. For example, a video display application could have to wait to show a video to a user until the video display application receives the new packet.

The aspects of the present invention recognize that requesting retransmission of incomplete data packets has several problems. First, the portion of the incomplete data packet that was, in-fact, received correctly is wasted. Second, additional network bandwidth resources are required to retransmit the incomplete data packet. Third, target 318 is denied the opportunity to use incomplete data packet 312. Some targets 318 are capable of accepting and using incomplete data packets 312. For example, a real-time application, like a streaming video player, may be able to use an incomplete data packet to display a segment of a desired video. For this reason, delivery of incomplete data packets according to the methods and devices described herein is desirable.

Target 318 or a user can indicate to the communication protocol stack that it wishes to receive incomplete data packets by setting flag 320. For example, in a TCP/IP implementation, setting flag 320 can be achieved by setting a new flag in socket 304 to "SO_PARTIAL." Flag 320 can be set by sending a signal from target 318 to the receiving data processing system. The signal indicates that target 318 may use incomplete data packets 312. In this case, when reassembly timer 308 expires, incomplete data packets 318 are not rejected. Instead, the incomplete portions of incomplete data packets 318 are filled with a null character or some other pre-determined character, such as an ASCII character, in component 310. Alternatively, if target 318 so requires, then the incomplete portions of incomplete data packets 318 may not be filled. In either case, incomplete data packets 318 are then considered final data packets 315. Final data packets 315 are then prepared for delivery at delivery component 316 and are subsequently delivered to target 318.

Optionally, target 318 is notified when final data packets 315 are delivered to it. This notification mechanism may differ in different data processing system architectures. Different data processing system architectures may handle the interaction between communication protocol stack 302 and target 318 according to different methods. In the TCP/IP environment, for example, the interaction is handled by adding a new flag called "msg_partial" and setting the new flag in the "msg_hdr" data structure of the "recvmsg" subroutine. Thus, target 318 will receive notification that target 318 is receiving final data packet 315. In addition, target 318 may optionally be provided with further information regarding whether final data packet 315 has been character filled. If final data packet 315 is character filled, then target 318 optionally may be provided with further information regarding what type of characters have been used to fill final data packet 315.

Figure 4:
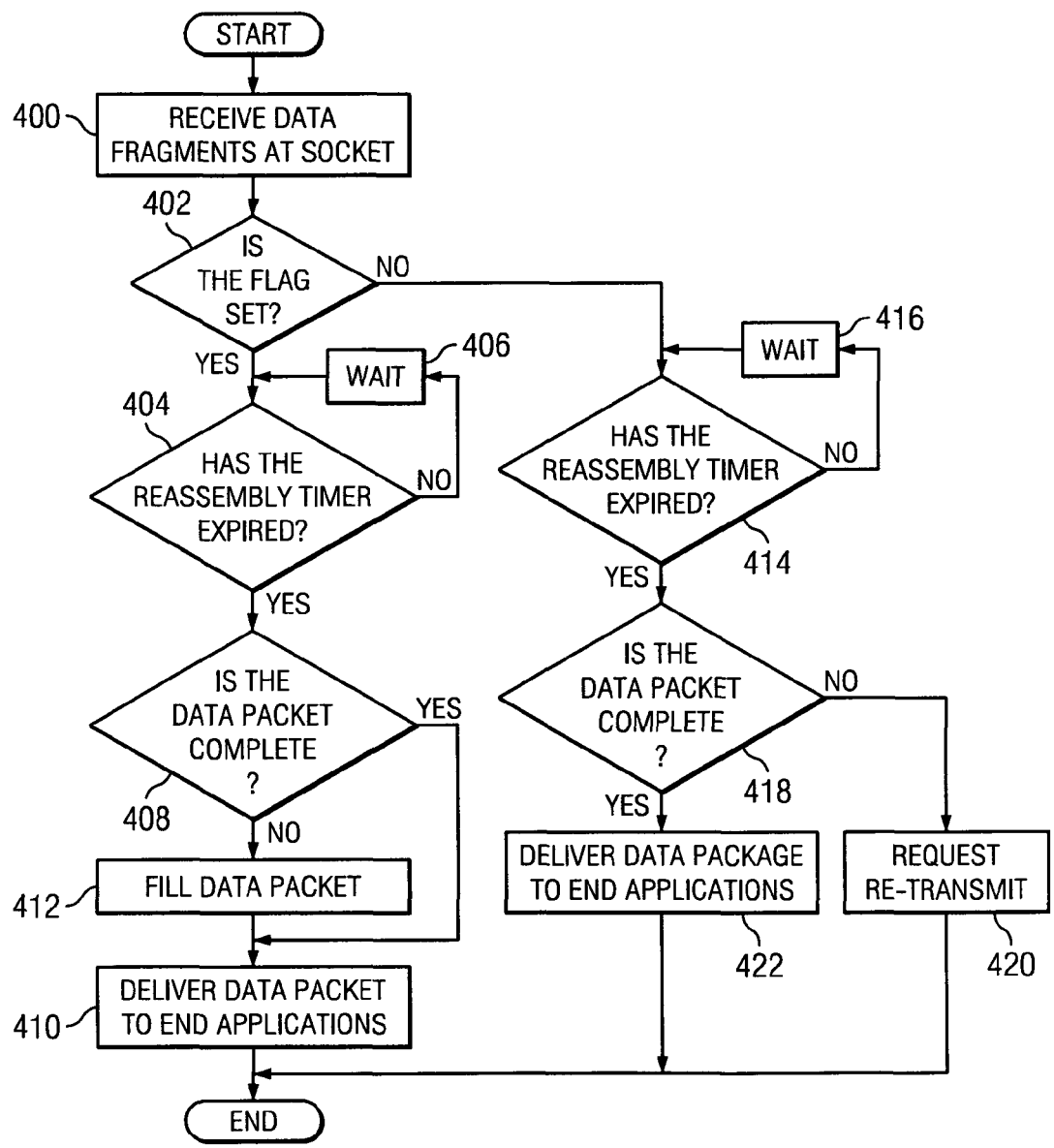
FIG. 4 is a flow chart showing processing of data fragments in conjunction with a timer, in accordance with an illustrative embodiment of the present invention.

FIG. 4 is a flowchart showing processing of data fragments in conjunction with a timer, in accordance with an illustrative embodiment of the present invention. The process shown in FIG. 4 may be implemented in communication protocol stack 302, as shown in FIG. 3 and as described above. In addition, the process may be implemented in a data processing system, such as data processing system 200 shown in FIG. 2, using data fragments received via a network, such as network 102 in FIG. 1.

Initially, one or more data fragments are received at the receiving data processor system's socket (step 400). The one or more data fragments form a set of received data fragments. A determination is then made whether a flag has been set such that the target, such as target 318 in FIG. 3 will receive incomplete data packets or character filled data packets (step 402).

If the flag has been set (step 402), then a determination is made whether a reassembly timer has expired (step 404). A reassembly timer is a timer that is considered expired on a time scale that is long compared to the second, or short, reassembly timer described below. For example, a reassembly timer may be considered expired after thirty seconds in a system that uses TCP/IP. If the reassembly timer has not expired, then the communication protocol stack continues to wait until the reassembly timer has expired (step 406). While the communication protocol stack is waiting, data fragments are continually received at the socket (step 400). Thus, the communication protocol stack continues to receive data fragments at step 400 and the assembly component continues to assemble the data fragments into a data packet so long as the reassembly timer has not expired. However, once the reassembly timer has expired, a determination is made whether a data packet, assembled from the set data fragments received while the reassembly timer was counting, is complete. A data packet is complete if the data packet contains all of the information sent by the source data processing system; otherwise, the data packet is considered incomplete. If the data packet is complete at step 408, then the completed data packet is delivered to the target (step 410). Thereafter the process terminates.

However, if the data packet is incomplete at step 408, then optionally the incomplete data packet is character filled to form a final data packet (step 412). An incomplete data packet is character filled if some or all of the data missing in the incomplete packet is replaced with a character, such as a null character, an ASCII character, or some other character.

Thus, sockets will be initialized or modified to indicate that data within missing fragments of a received datagram will be replaced by a default character, such as a null character, or a user-defined character. In addition, the user-defined replacement character can be provided via the setsockopt( ) subroutine call. The setsockopt( ) subroutine call can also be enhanced with a new option "SO_PARTIAL" which sets a flag that will cause received internet protocol datagrams with missing data to be completed by a user defined or default character and passed to a transfer control protocol or a user datagram format protocol. The recvmsg( ) subroutine call can provide notification on return. The recmsg( ) subroutine has the argument "struct msghdr," which is a pointer to a structure with the member "msg_flags." The member "msg_flags" can be enhanced with the flag "MSG_PARTIAL" that is returned as a non-zero number when the recvmsg( ) subroutine receives data that was filled with the default or user-defined character.

Returning to step 412, the final data packet is delivered to the target (step 410). The process terminates thereafter.

Returning to step 402, if the flag has not been set, then a determination is made whether a reassembly timer has expired (step 414). The reassembly timer at step 414 may be the same reassembly timer at step 404, or may be a different timer with a different expiration time. If the reassembly timer has not expired, then the communication protocol stack continues to wait (step 416). While waiting, the communication protocol stack continues to receive data fragments at step 400 and the assembly component continues to assemble the data fragments into a data packet.

If the reassembly timer has expired, then a determination is made whether the data packet formed from the data fragments received at step 400 is complete (step 418). If the data packet is incomplete, then the destination data processing system transmits a re-transmit request signal to the source data processing system. The re-transmit request signal requests that the source data processing system re-transmit the entire data packet (step 420). Thereafter, the process terminates. On the other hand, if the data packet is complete, then the data packet is delivered to the target (step 422). Again, the process terminates thereafter.

In the above process, two properties are being tracked, the expiration of the reassembly timer and the completeness of the reassembled data packet. The order in which these properties are checked may be changed as long as the logical results of the checking process remain the same.

The reassembly timer, such as reassembly timer 308 in FIG. 3 and the reassembly timer referenced in steps 404 and 414 in FIG. 4, is fixed at 30 seconds. This time allows for reassembly of each data packet from its corresponding data fragments. This 30 second time limit was set in slower networks when 30 seconds was needed to complete the reception of all data fragments belonging to a single data packet. Today, continued use of a fixed duration reassembly timers tends to slow down the speed of data communications when the completeness status of a data packet cannot be determined for a duration as long as 30 seconds. Thus, the 30 second limit may be reduced or decremented to a limit corresponding to the speed of a modern network.

Figure 5:
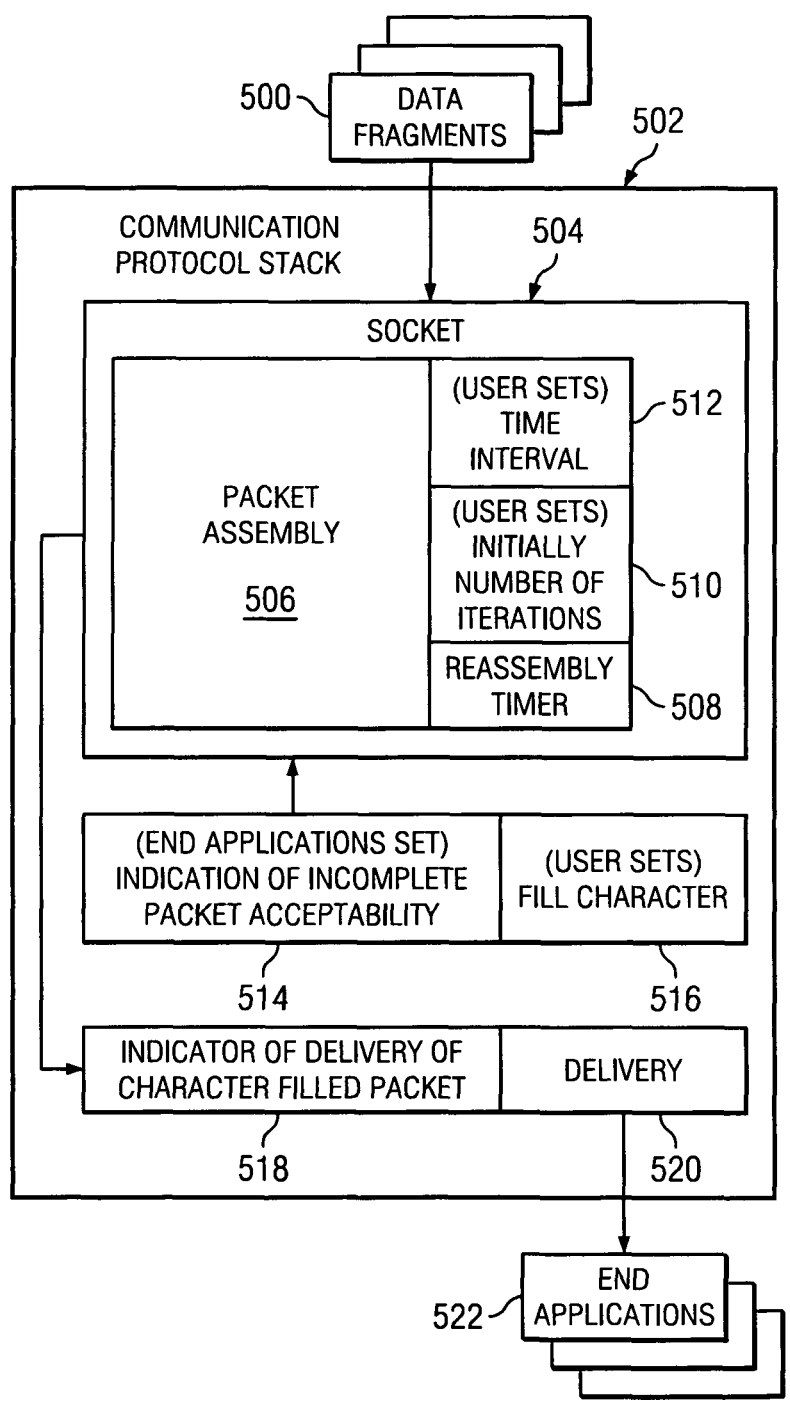
FIG. 5 is a flow chart showing processing of data fragments in conjunction with a timer in accordance with an illustrative embodiment of the present invention.

FIG. 5 is a block diagram of the components used to process data fragments in accordance with an illustrative embodiment of the present invention. One or more data fragments 500 are received at communication protocol stack 502 of a receiving data processing system. Specifically, data fragments 500 are received at socket 504. Socket 505 includes packet assembly component 506, which includes hardware and/or software adapted to assemble data fragments into completed packets. Data fragments 500 are passed to packet assembly component 506. Several such data fragments may be similarly received for each data packet transmitted between a source data processing system and the receiving data processing system. Packet assembly component 506 of communication protocol stack 502 assembles data fragments 500 in an attempt to form one or more completed data packets. A completed data packet ideally is an exact copy of a data packet as originally sent.

The reassembly process is limited at the expiration of reassembly timer component 508 in the communication protocol stack. Optionally, a user, software, or hardware sets a reassembly timer time interval in set time interval component 512 to a time interval shorter than the duration of reassembly timer component 508, preferably 15-30 milliseconds. The user, using set number of iterations component 510, may also set the number of iterations that reassembly timer component 508 will be used, as described below in relation to FIG. 6.

In addition, flag component 514 provides an indication of whether target 522 will accept incomplete packets to socket 504. Target 522 provides such an indication. A user or some other component may also use character fill component 516 to define what characters are used to character fill an incomplete packet, as further described with respect to FIG. 6.

Similarly, flag component 518 may provide an indicator to target 522 that an incomplete packet has been character filled. The indicator can also indicate what character or characters were used to character fill an incomplete packet. All completed and incomplete packets are then delivered to target 522 via delivery component 520.

Figure 6:
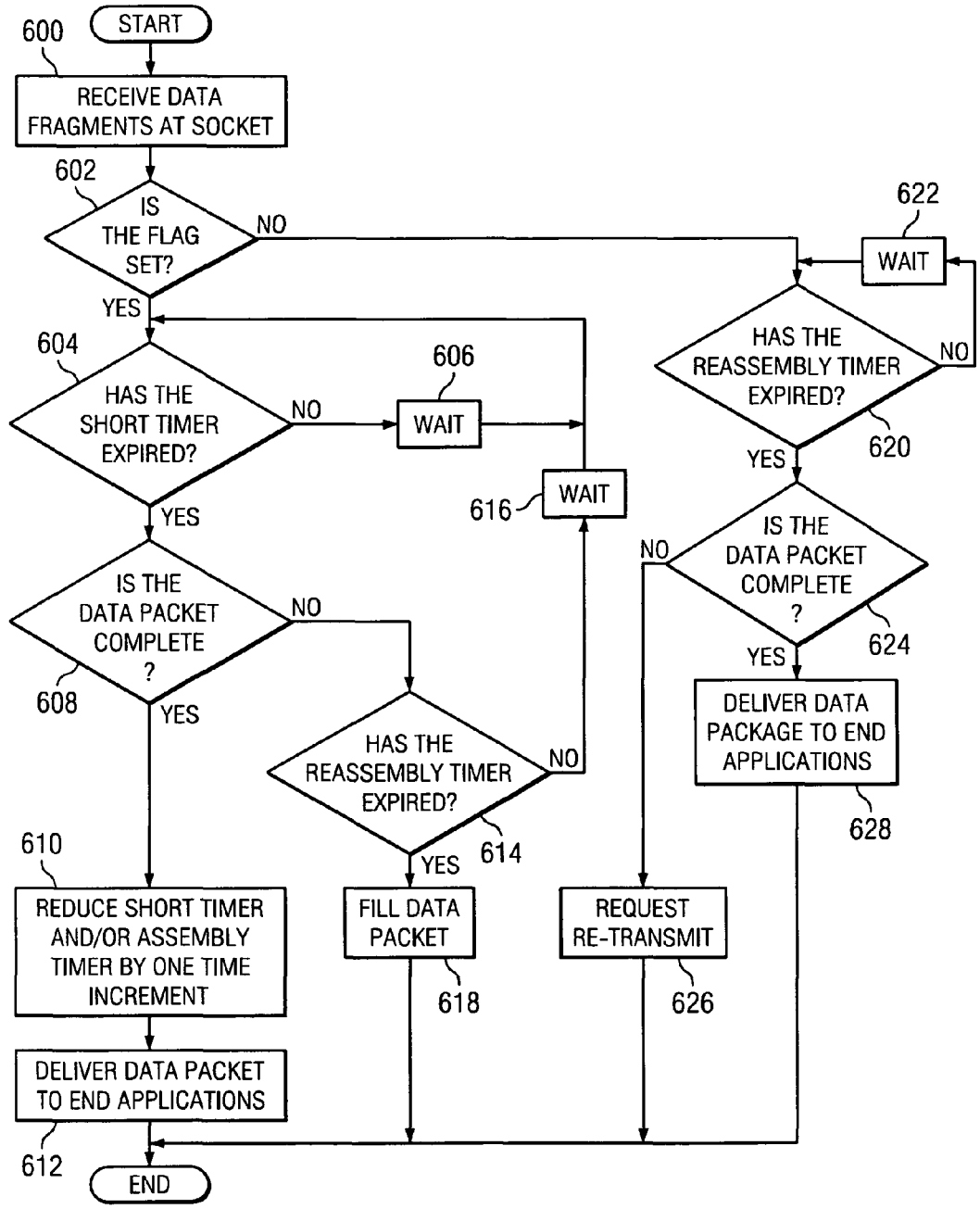
FIG. 6 is a flowchart showing processing of data fragments in conjunction with an adjustable timer in accordance with an illustrative embodiment of the present invention.

FIG. 6 is a flowchart showing processing of data fragments in conjunction with an adjustable timer in accordance with an illustrative embodiment of the present invention. The process shown in FIG. 6 may be implemented in communication protocol stack 502, as shown in FIG. 5 and as described above. In addition, the process may be implemented in a data processing system, such as data processing system 200 shown in FIG. 2, using data fragments received via a network, such as network 102 in FIG. 1.

Initially, one or more data fragments are received at the socket of the receiving data processor system (step 600). The one or more data fragments form a set of received data fragments. A determination is then made whether a flag has been set such a target will receive incomplete data packets or character filled data packets, both of which may be referred to as final data packets (step 602). The flag may be set according to the method described with respect to FIG. 3 and FIG. 4.

If the flag has been set (step 602), then a determination is made whether a short timer has expired (step 604). A short timer is a timer that has an expiration period that is short compared to a reassembly timer, such as reassembly timer 508 in FIG. 5 or the reassembly timer used in steps 612 and 618. The short timer is used to further increase the speed of processing packets. The short timer may be, for example, one millisecond, or may be any time period set by a user or set by the manufacturer of the communication protocol stack.

If the short timer has not expired, then the packet assembly component, such as packet assembly 506 in FIG. 5, continues to wait (step 606). Additional data fragments may be received during this waiting step (step 606). In addition, the packet assembly component attempts to assemble all received data fragments into a data packet in a manner similar to that described with respect to FIG. 4. Once the short timer has expired (step 604), then a determination is made whether a data packet is complete (step 608). Optionally, if the data packet is complete, then the expiration value of the short timer is reduced by one time increment (step 610); a process which may be referred to as decrementing. A time increment may be set by the user or may be a pre-determined time increment, such as one millisecond, one second, or any other time increment. The time interval of the short timer may be set in time interval component 512 in FIG. 5. In addition, a user or the communication protocol stack manufacturer may set the number of iterations the process between steps 604 and 614 may take. For example, a user may determine that the process between steps 604 and 614 should not iterate more than five times, or any other number of times, until the process is forced to continue to step 618—even if the reassembly timer has not yet expired. This number of iterations may be set in number of iterations component 510 shown in FIG. 5.

Thus, as subsequent data fragments are received at step 600, less time is used before checking for whether one or more data fragments have been completed into a completed data packet by the packet assembly component. In addition, the reassembly timer, such as reassembly timer 508 in FIG. 5 and the reassembly timer used in step 614, may also be decremented by one time increment (step 610). Thus, the reassembly timer will shorten, providing the assembly component less time to assemble a completed data packet. In addition, eventually, as new data fragments and new data packets are received, the entire process shown in FIG. 6 will result in final, filled data packets being delivered to the target. Thus, the process shown in FIG. 6 will maximize the speed at which data fragments are processed, thereby increasing the speed at which the target receives data packets and also increasing the overall efficiency of the network. In any case, the completed data packet is then delivered to the target for which the data packet is intended (step 612). The process terminates thereafter with respect to that data packet.

Returning to step 608, if the data packet is not complete, then a determination is made whether the reassembly timer has expired (step 614). The duration of the reassembly timer may be set in the time interval component shown in FIG. 5. If the reassembly timer has not expired, then the packet assembly component continues to collect and assemble data fragments while waiting for the reassembly timer to expire (step 614). The process then returns to step 604, wherein the process described in the preceding paragraph repeats. Thus, the short timer will result in completed data packets being quickly delivered to the target, as compared to waiting solely for the reassembly timer to expire in step 614.

Returning to step 614, if the reassembly timer has expired, then the incomplete data packet is character filled (step 616). An incomplete data packet is character filled if some or all of the data missing in the incomplete packet is replaced with a character, such as a null character, an ASCII character, or some other character. The character filled data packet may then be referred to as a final data packet, as may an incomplete data packet that is ultimately delivered to the target (step 612). Thus, optionally, the incomplete data packet need not be character filled. The process terminates thereafter.

The overall process described above may be characterized as follows, as one or more data fragments are used to create a completed data packet receiving an incomplete data packet. First, the process includes receiving, at the data processing system, a signal indicating that a target can accept incomplete data packets. The process also includes receiving, at the data processing system, a data packet. A determination is then made whether the data packet is an incomplete data packet. Responsive to a determination that the data packet is an incomplete data packet, the incomplete data packet is filled with at least one character to form a final data packet. The final data packet is then delivered to the target.

Returning to step 602, if the flag has not been set, then a determination is made whether a reassembly timer has expired (step 620). The reassembly timer at step 620 may be the same reassembly timer at step 604, or may be a different timer with a different expiration time. If the reassembly timer has not expired, then the communication protocol stack continues to wait (step 622). While waiting, the communication protocol stack continues to receive data fragments at step 600 and the assembly component continues to assemble the data fragments into a data packet.

If the reassembly timer has expired, then a determination is made whether the data packet formed from the data fragments received at step 600 is complete (step 624). If the data packet is incomplete, then the destination data processing system transmits a re-transmit request signal to the source data processing system. The re-transmit request signal requests that the source data processing system re-transmit the entire data packet (step 626). Thereafter, the process terminates. On the other hand, if the data packet is complete, then the data packet is delivered to the target (step 628). Again, the process terminates thereafter.

Thus, the methods and devices described herein have several advantages over known methods of processing incomplete data packets. For example, automatic retransmission of incomplete data packets is reduced or eliminated, thereby reducing the network resources required to transmit a particular file. Thus, the performance of the network is improved. In addition, use of incomplete data packets allows the target, the actual consumer of the data packet, to decide if the incomplete data packet is adequate. Hence, delay in providing users or targets with desired content is reduced. When thousands, even millions, of packets are transmitted and received in an ordinary routine data communication, the total savings in time may be considerable. Thus, by accepting packets even if they are incomplete, the total number of packets transmitted over a network is reduced and the total delay is reduced accordingly.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-readable medium providing program code for use by or in connection with a computer or any instruction execution system. For the purposes of this description, a computer-usable or computer readable medium can be any tangible apparatus that can contain, store, communicate, or transport the program for use by or in connection with the instruction execution system, apparatus, or device.

The medium can be a tangible medium, or an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code is retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-performed method of processing data received by a networking protocol stack of a computer system, the method comprising:
    first receiving multiple fragments of a packet at the networking protocol stack of the computer system, wherein the packet is en-route to a target application for further processing, and wherein the target application selectively sends an indication that the target application can accept incomplete packets if the target application can accept incomplete packets, and wherein if the target application can accept incomplete packets, but requires unfilled incomplete packets, the target application sends a second indication indicating that packets should not be filled;
    determining that one or more fragments of the packet are missing;
    selectively, if the target application sent the indication that the target application can accept incomplete packets, second receiving the indication that the target application can accept incomplete packets;
    selectively, in response to the second receiving the indication that the target application can accept incomplete packets, filling the portions of the packet represented by the fragments with a predetermined constant value to produce a filled packet;
    further selectively, in response to the second receiving the indication that the target application can accept incomplete packets, sending the filled packet onward in the networking stack of the computer system to a target application, wherein if the target application did not send the indication that the target application can accept incomplete packets, whereby if the indication is not received by the second receiving, the filling and the sending are not performed and the packet is rejected; and
    third receiving the second indication from the application that packets should not be filled, wherein the filling is further performed selectively in response to whether the second indication was received, and wherein the sending sends the filled packet if the second indication was not received and sends an unfilled packet if the second indication was received.

2. The computer-performed method of claim 1, wherein the target application sends the indication that the target application can accept incomplete packets to a network protocol stack of the computer system, and wherein the selectively filling is performed within the network protocol stack.

3. The computer-performed method of claim 2, further comprising:
    selectively, if the target application can accept incomplete packets, sending a second indication of the predetermined constant value to the target application; and
    selectively, if the portions of the packet were filled by the selectively filling, within the target application, detecting the filled portions of the packet by comparing values within the packet to the predetermined constant value.

4. The computer-performed method of claim 1, further comprising marking the filled packet as a partially filled packet prior to performing the sending.

5. The computer-performed method of claim 4, wherein the filled packet is a TCP/IP packet and wherein the marking comprises setting a flag in a header of the packet that indicates that the packet is a partially filled packet.

6. The computer-performed method of claim 1, further comprising:
    initializing a reassembly timer for timing a time period during which the packet must be assembled from the multiple fragments received by the first receiving;
    determining that the reassembly timer has expired; and
    responsive to determining that the reassembly timer has expired, performing the selectively filling if the second receiving received the indication that the target application can accept incomplete packets, and then performing the sending.

7. A computer system, comprising:
    a microprocessor for executing program instructions, a storage for storing the program instructions; and
    a network interface coupled to the microprocessor, wherein the program instructions are program instructions for processing data received from the network interface by a networking protocol stack of the computer system, the program instructions comprising program instructions for first receiving multiple fragments of a packet at the networking protocol stack, wherein the packet is en-route to a target application for further processing, and wherein the target application selectively sends an indication that the target application can accept incomplete packets if the target application can accept incomplete packets, wherein if the target application can accept incomplete packets, but requires unfilled incomplete packets, the target application sends a second indication indicating that packets should not be filled, determining that one or more fragments of the packet are missing, selectively, if the target application sent the indication that the target application can accept incomplete packets, second receiving the indication that the target application can accept incomplete packets, selectively, in response to the second receiving the indication that the target application can accept incomplete packets, filling the portions of the packet represented by the fragments with a predetermined constant value to produce a filled packet, further selectively, in response to the second receiving the indication that the target application can accept incomplete packets, sending the filled packet onward in the networking stack of the computer system to a target application, wherein if the target application did not send the indication that the target application can accept incomplete packets, whereby if the indication is not received by the second receiving, the filling and the sending are not performed and the packet is rejected, and third receiving the second indication from the application that packets should not be filled, wherein the program instructions for filling are further executed selectively in response to whether the second indication was received, and wherein the program instructions for sending send the filled packet if the second indication was not received and send an unfilled packet if the second indication was received.

8. The computer system of claim 7, wherein the program instructions further comprise program instructions for the target application sending the indication that the target application can accept incomplete packets to a network protocol stack of the computer system, and wherein the program instructions for selectively filling are program instructions of the network protocol stack.

9. The computer system of claim 8, wherein the program instructions further comprise program instructions for:
selectively, if the target application can accept incomplete packets, sending a second indication of the predetermined constant value to the target application; and
selectively, if the portions of the packet were filled by the selectively filling, within the target application, detecting the filled portions of the packet by comparing values within the packet to the predetermined constant value.

10. The computer system of claim 7, wherein the program instructions further comprise program instructions for marking the filled packet as a partially filled packet prior to performing the sending.

11. The computer system of claim 10, wherein the filled packet is a TCP/IP packet and wherein the program instructions for marking comprise program instructions for setting a flag in a header of the packet that indicates that the packet is a partially filled packet.

12. The computer system of claim 7, wherein the program instructions further comprise program instructions for:

initializing a reassembly timer for timing a time period during which the packet must be assembled from the multiple fragments received by the first receiving;
determining that the reassembly timer has expired; and
responsive to determining that the reassembly timer has expired, executing the program instructions for selectively filling if the second receiving received the indication that the target application can accept incomplete packets and then executing the program instructions for performing the sending.

13. A computer program product comprising a non-transitory computer readable storage device storing program instructions for execution within a general-purpose computer system, wherein the program instructions are program instructions for processing data received from the network interface by a networking protocol stack of the computer system, the program instructions comprising program instructions for:
first receiving multiple fragments of a packet at the networking protocol stack, wherein the packet is en-route to a target application for further processing, and wherein the target application selectively sends an indication that the target application can accept incomplete packets if the target application can accept incomplete packets, wherein if the target application can accept incomplete packets, but requires unfilled incomplete packets, the target application sends a second indication indicating that packets should not be filled;
determining that one or more fragments of the packet are missing; selectively, if the target application sent the indication that the target application can accept incomplete packets, second receiving the indication that the target application can accept incomplete packets;
selectively, in response to the second receiving the indication that the target application can accept incomplete packets, filling the portions of the packet represented by the fragments with a predetermined constant value to produce a filled packet;
further selectively, in response to the second receiving the indication that the target application can accept incomplete packets, sending the filled packet onward in the networking stack of the computer system to a target application, wherein if the target application did not send the indication that the target application can accept incomplete packets, whereby if the indication is not received by the second receiving, the filling and the sending are not performed and the packet is rejected; and
third receiving the second indication from the application that packets should not be filled, wherein the program instructions for filling are further executed selectively in response to whether the second indication was received, and wherein the program instructions for sending send the filled packet if the second indication was not received and send an unfilled packet if the second indication was received.

14. The computer program product of claim 13, wherein the program instructions further comprise program instructions for the target application sending the indication that the target application can accept incomplete packets to a network protocol stack of the computer system, and wherein the program instructions for filling are program instructions of the network protocol stack.

15. The computer program product of claim 14, wherein the program instructions further comprise program instructions for:

selectively, if the target application can accept incomplete packets, sending a second indication of the predetermined constant value to the target application; and selectively, if the portions of the packet were filled by the selectively filling, within the target application, detecting the filled portions of the packet by comparing values within the packet to the predetermined constant value.

16. The computer program product of claim 13, wherein the program instructions further comprise program instructions for marking the filled packet as a partially filled packet prior to performing the sending.

17. The computer program product of claim 13, wherein the program instructions further comprise program instructions for:

initializing a reassembly timer for timing a time period during which the packet must be assembled from the multiple fragments received by the first receiving;

determining that the reassembly timer has expired; and responsive to determining that the reassembly timer has expired, executing the program instructions for selectively filling if the second receiving received the indication that the target application can accept incomplete packets, and the program instructions for performing the sending.

* * * * *